(12) United States Patent
Feng et al.

(10) Patent No.: US 6,224,763 B1
(45) Date of Patent: May 1, 2001

(54) HOLLOW-FIBER MEMBRANE DEVICE INCLUDING A SPLIT DISK TUBE SHEET SUPPORT

(76) Inventors: Xianshe Feng, #303, 11435 - 41 Avenue, Edmondton, Alberta (CA), T6J 0T9; John Ivory, 9316 - 86 Street, Edmonton, Alberta (CA), T6C 3E7

( * ) Notice: Subject to any disclaimer, the term of this patent is extended or adjusted under 35 U.S.C. 154(b) by 0 days.

(21) Appl. No.: 09/305,655

(22) Filed: May 5, 1999

(51) Int. Cl.[7] .................................................. B01D 63/02
(52) U.S. Cl. ................ 210/232; 210/321.8; 210/321.89; 210/451; 210/455
(58) Field of Search ................................ 210/232, 321.8, 210/321.89, 323.2, 435, 446, 451, 455

(56) References Cited

U.S. PATENT DOCUMENTS

| | | |
|---|---|---|
| 4,707,267 | 11/1987 | Johnson . |
| 4,929,259 | 5/1990 | Caskey et al. . |
| 4,961,760 | 10/1990 | Caskey et al. . |
| 5,013,437 | 5/1991 | Trimmer et al. . |
| 5,160,042 | 11/1992 | Bikson et al. . |
| 5,211,728 * | 5/1993 | Trimmer ........................... 210/321.8 |

* cited by examiner

Primary Examiner—Matthew O. Savage
(74) Attorney, Agent, or Firm—Bennett Jones LLP

(57) ABSTRACT

A hollow fiber membrane device adapted for bore side feed includes a split annular disk as a tube sheet support. The device may be assembled without integrating tube sheet support means into the hollow fiber bundle and tube sheet combination and without in situ tube sheet formation.

5 Claims, 5 Drawing Sheets

HOLLOW-FIBER MEMBRANE DEVICE INCLUDING A SPLIT DISK TUBE SHEET SUPPORT

FIELD OF INVENTION

This invention relates to hollow fiber membrane devices for fluid processing. More particularly, it relates to double open ended hollow fiber bundle device and methods of assembling such devices.

BACKGROUND OF THE INVENTION

Hollow fiber membrane devices for fluids processing are generally assembled in a fashion resembling a shell-and-tube heat exchanger. A plurality of hollow fibers are arranged in an elongated bundle and encased in a shell containment housing. The hollow fibers are embedded in a tube sheet at both ends, which tube sheet is normally fabricated from a resin material. The fluid processing devices using hollow fiber membranes may be configured either as a shell side feed device or a bore side feed device.

In the shell side feed configuration, the fluid to be treated is introduced to the outside of the hollow fibers, and a portion of the fluid permeates through the fiber wall into the lumens of the hollow fibers. The permeate fluid is removed from one or both ends of the fiber lumens. The non-permeate fluid is discharged from a region on the shell side that is often longitudinally distant from the fluid inlet to achieve a desired co-current or countercurrent flow configuration. Clearly, in the shell side feed configuration, at least one tube sheet should be made in such a fashion that the bores of the hollow fibers communicate through the tube sheet and are open to the exterior face of the tube sheet that is opposite the fiber bundle. Such a tubesheet is referred to as an active tube sheet, which allows for introduction of a fluid to or removal from the fiber lumens. Depending on whether one or both tube sheets are active, the fiber bundle is considered to be single open-ended or double open-ended. Most commercial hollow fiber membrane devices for fluid separation adapt the shell side feed configuration.

Alternatively, in a bore side feed separator, the fluid to be treated can be admitted to the fiber lumens at one end of the hollow fiber device, and a non-permeate fluid exits from the fiber bores at the other end of the device. This requires two active tube sheets, one at each end of the fiber bundle. This latter configuration has been used for certain applications such as nitrogen production from air.

In fluid processing by membranes, a significant pressure differential across the membrane is often required to provide the driving force for mass transfer from one side of the membrane to the other side of the membrane. Compared to shell side feed, a more even flow distribution of feed on membrane surface is achieved in the bore side feed hollow fiber devices, which is beneficial to an efficient operation. Further, in the bore side feed configuration, only the fiber wall and the end caps are pressurized, and the pressure at the shell side of the membrane device is substantially low, which reduces the mechanical strength requirement of the casing shell of the device. However, when a pressurized fluid moves to or from the fiber bores, significant pressure is exerted on the tube sheets. Because there are no balancing forces on the inner surface of the tube sheets, the pressure causes the fiber bundle to collapse between the tube sheets.

Various prior art devices have support means for the fiber bundle and the tube sheets. U.S. Pat. No. 4,961,760 issued to Caskey et al. teaches a boreside feed hollow fiber membrane fluid separation device which has a cylindrical tube sheet support means which encases the hollow fiber bundle and embeds in the tube sheets at either end of the bundle. The tube sheet support means must be integrated into the hollow fiber bundle at the time of manufacture, adding to the expense and complexity of the hollow fiber bundles.

Alternatively, there are devices in which the casing itself acts as the tubesheet support means by having a cross-sectional diameter less than the diameter of the tubesheet. However, in these devices, at least one tube sheet must be formed in place after the hollow fibre bundle has been inserted into the casing which is a cumbersome procedure. In U.S. Pat. No. 4,929,259, a device is disclosed which requires formation of resin plugs to augment the tube sheets after they have been assembled with the casing shell.

SUMMARY OF INVENTION

This invention relates to fluid processing devices containing a double open-ended hollow fiber bundle for bore-side feed fluid processing.

The present invention provides a design of hollow fiber membrane devices suitable for bore side feed and yet allows for slip-in installation of a pre-formed fiber bundle with two tube sheets. At least one tube sheet is supported by a split disk to balance the force resulting from the pressure difference exerted longitudinally cross the tube sheet. Advantageously, the fiber bundle with both tube sheets can be formed prior to insertion into a casing shell or housing. The present invention requires no subsequent processing on the tube sheets after they are inserted into the housing. Moreover, the hollow fiber membrane device of this invention is easy to disassemble. The replacement of hollow fiber membrane bundle in the membrane device is straightforward, and the membrane containment vessel is reusable without needing any machining work. These features are especially desired for on-site service of membrane devices.

Basic components of the device of this invention include a plurality of hollow fiber membranes arranged in an elongated bundle encased in a fluid impermeable shell housing. At each end of the fiber bundle, the fibers are embedded in a tube sheet fabricated of an epoxy or other resin material. The fiber bundle is arranged such that the hollow fibers communicate through the tube sheet with the fiber bores being open on the exterior surface of the tube sheets that are opposite of the fiber bundle. At least one tube sheet is supported by a support means comprised of a split disk placed against the tube sheet in the region adjacent to an annular area on the interior surface of the tube sheet that is facing the fiber bundle. First and second end caps are arranged and adapted for sealing the shell casing at the first and the second ends of the housing near the first and the second tube sheets, respectively. At least one end cap is adapted to receive a tube sheet. This device can have a number of ports for fluid introduction and discharge, depending on specific applications, as discussed below. At least one fluid entrance port is used to direct a fluid into the bores of the hollow fiber membranes at one end of the fiber bundle, and at least one fluid exit port is located at the other end of the fiber bundle to discharge a fluid from the bores of the hollow fibers. A space is defined between the external surface of the hollow fibers and the housing. In a four-port device, a fluid inlet and a fluid outlet in the housing located near the two ends of the fiber bundle communicate with this space. If there is a fluid outlet and no fluid inlet in the housing, the device becomes a three fluid-port device. If both fluid inlet and outlet in the housing are absent or plugged, the device becomes a two-port device. Other multi-port configurations are, of course, possible.

The hollow fibers in the devices can be any hollow fiber membranes, porous or non-porous, polymeric or non-polymeric, depending on specific applications. In a preferred embodiment, the hollow fibers are arranged around a center core in a cylindrical shape. The center core may be a tube or a rod, fabricated of plastic or metal materials, which extends to both tube sheets of the fiber bundle.

Thus, in one aspect of the invention, the invention comprises a bore side feed hollow fiber membrane fluid separation device comprising:
  (a) a cylindrical housing having an internal diameter and first and second ends wherein said first end includes a support flange;
  (b) a plurality of hollow fiber membranes arranged in a longitudinal bundle, said bundle having first and second ends and an external diameter;
  (c) a first tube sheet having an external face and an internal face and having a diameter less than the internal diameter of the housing, said first tube sheet encasing the first end of the hollow fiber membrane bundle such that the hollow fiber membranes communicate through and are open on the external face;
  (d) a second tube sheet having an external face and an internal face and which encases the second end of the hollow fiber membrane bundle such that the hollow fiber membranes communicate through and are open on the external face, wherein said second tube sheet is supported at the second end of the housing;
  (e) a first end cap which engages the housing in a fluid tight manner to enclose the external face of the first tube sheet and a second end cap which engages the housing in a fluid tight manner to enclose the external face of the second tube sheet; and
  (f) a tube sheet support comprising an annular disk split into two or more portions which together encircle the hollow fiber membrane bundle adjacent the internal face of the first tube sheet and which has an outside diameter greater than the internal diameter of the housing such that the annular disk is supported by the support flange.

In a preferred embodiment, the second end of the housing also includes a support flange and the second tube sheet also has a diameter less than the internal diameter of the housing. The device further comprises a second tube sheet support comprising an annular disk split into two portions which together encircle the hollow fiber membrane bundle adjacent the internal face of the second tube sheet.

In a further preferred embodiment, the housing comprises two cylindrical portions connected by a threaded joining member which when rotated in one direction causes the housing to increase in length and when rotated in the other direction causes the housing to decrease in length.

In another aspect of the invention, the invention comprises a method of assembling a hollow fiber membrane device, said method comprising:
  a) providing a hollow fiber membrane bundle having first and second tube sheets at each end of the bundle;
  b) providing a cylindrical housing having a first end having a support flange, a second end having a support shoulder, an inside diameter greater than the diameter of the first tube sheet, and having a length between the support shoulder and the support flange approximately equal to the length of hollow fiber membrane bundle between the first and second tube sheets;
  c) inserting the first tube sheet and the hollow fiber membrane bundle into the second end of housing until the second tube sheets rests against and is supported by the support shoulder;
  d) supporting the first tube sheet by inserting a first portion of an annular disk between the support flange and the first tube sheet and then inserting a second portion of the annular disk such that the first and second portions fit together to encircle the hollow fiber bundle; and
  e) capping the first and second ends of the housing in a fluid tight manner.

In another aspect of the invention, the invention is a method of assembling a hollow fiber membrane device, said method comprising:
  a) providing a hollow fiber membrane bundle having first and second tube sheets at each end of the bundle;
  b) providing a cylindrical housing having a first end having a support flange, a second end having a support flange, an inside diameter greater than the diameter of the first tube sheet, and having a length between the first support flange and the second support flange approximately equal to the length of hollow fiber membrane bundle between the first and second tube sheets;
  c) inserting the first tube sheet and the hollow fiber membrane bundle into the second end of housing;
  d) supporting the second tube sheet with an annular disk which abuts the second support flange on one side and the tube sheet on the other side;
  e) supporting the first tube sheet by inserting a first portion of an split annular disk between the support flange and the first tube sheet and then inserting a second portion of the annular disk such that the first and second portions fit together to encircle the hollow fiber bundle and the annular disk abuts the first support flange on one side and the first tube sheet on the other side; and
  f) capping the first and second ends of the housing in a fluid tight manner.

DESCRIPTION OF THE DRAWINGS

The invention will now be described by way of four exemplary embodiments, with reference to the accompanying simplified, diagrammatic, not-to-scale drawings.

DETAILED DESCRIPTION OF THE INVENTION

Figure 1:
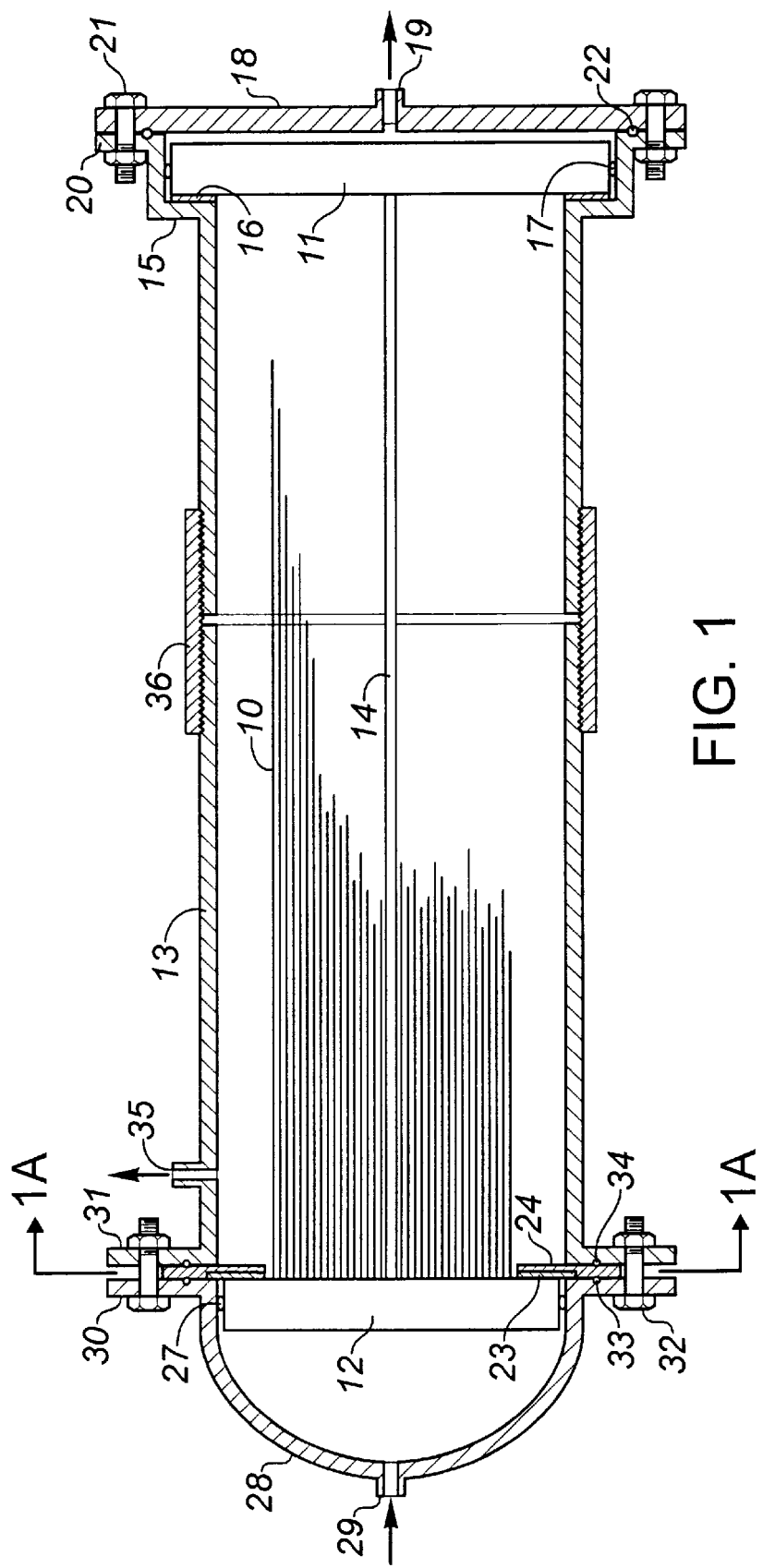
FIG. 1 is a longitudinal sectional representation of a hollow fiber membrane device of the present invention.

This invention is directed to a novel hollow fiber membrane device which includes a tube sheet support that allows for convenient assembling of the separator, eliminating the need for tube sheet processing once the fiber bundle has been inserted into the housing.

As used herein, the following terms have the following meanings:

(a) The term "fluid" refers to any substance in a gaseous, liquid or vapour state;

(b) The term "hollow fiber" refers to an elongate fiber having a central bore and openings at each end, which fiber can be either non-porous to allow for selective permeation of one or more components in a fluid mixture or micro porous to allow for fluid communication through the pores in the fiber well;

(c) The term "pores" in the fiber wall refer to the passageways through which a fluid can communicate across the fiber wall by viscous or Knudson flow mechanisms. When such pores are present in the fiber wall, the fiber is considered to be micro porous.

A plurality of hollow fiber membranes are arranged in an elongated bundle. Preferably, such a bundle takes a cylindrical shape with the two ends of the hollow fibers located at each end of the cylindrical bundle. About each end of the fiber bundle is a tube sheet. The tube sheet is arranged such that each of the hollow fibers is embedded in the tube sheet, and the bores of the hollow fibers communicate through both sides of the tube sheets. The tube sheet can be fabricated of any suitable potting materials. Preferably the tube sheet is comprised of resinous thermoset or thermoplastic materials that bond to but does not deterioratively affect the hollow fibers. The resin materials, when fully cured, should maintain adequate chemical stability and mechanical strength in the exposure to the fluid. The tube sheet can be formed in any suitable manner, such as casting a potting material around the end of the hollow fiber bundle or impregnating the ends of the fibers while assembling the hollow fibers to form a bundle. These techniques of tube sheet formation are well known to those skilled in the art. The tube sheet can take any shape. However, circular tube sheets with an appropriate width are preferred.

In some embodiments, the hollow fibers are arranged about a center core to form a bundle, such a core is arranged such that it extends through and is bonded to both tube sheets to provide support for the hollow fiber bundle and the tube sheets. The core can be a rod, a solid tube, a perforated tube, or a solid tube with perforated portions comprised of any rigid material, including plastics, metals, or composites.

The hollow fiber bundle is housed in a containment casing or housing that is open at both ends. An end cap is provided at each end of the housing. At least one end cap is used to receive a tube sheet. At least one tube sheet support is comprised of an annular disk which is split into two semicircular portions, which is placed against the tube sheet for balancing the force exerted on the face of the tube sheet that is opposite of the hollow fiber bundle. The split disk can be made of any material that can provide sufficient support to the tube sheet. Such materials include high strength plastics, composites, and metals. For sake of convenience, a metal such as steel are preferably used due to their strength, durability, and ease of fabrication. The end cap and the split annular disk are each attached to the housing by appropriate attachment means. Appropriate seals are used where necessary to maintain the fluid tightness of the housing and end caps.

Further, the membrane devices of this invention have one or more fluid inlet and one or more outlet means for fluid admission and discharge. At least one fluid inlet means is located at one end of the device and at least one fluid outlet means is located at the other end of the device such that a fluid may flow down through the bores of the hollow fibers. Generally, the fluid inlet and outlet means may be a port, a nozzle, a fitting, or other opening which allows fluid communication.

FIG. 1 illustrates a preferred embodiment of an assembled hollow fiber membrane device of the invention wherein one tube sheet is supported by a split annular disk. The device comprises a bundle of hollow fibers (10). At each end of the bundle, the fibers are embedded in a first tube sheet (11) and a second tube sheet (12). The second tube sheet (12) has a diameter smaller than the inside diameter of the shell casing (13) while the first tube sheet (11) has a diameter which is larger than that of the second tube sheet and the inside diameter of the shell casing (13).

Optionally, the device has a center core (14) about which the fibers are arranged. The center core and the hollow fibers are only depicted partially for simplicity. The center core (14) extends through to and is embedded in the first tube sheet (11) and the second tube sheet (12) at each of its ends.

To assemble this embodiment, the hollow fiber bundle (10) and the second tube sheet (12) are inserted into the casing shell (13). The first tube sheet (11) is supported by a shoulder (15) formed inside the casing to prevent the first tube sheet (11) from moving towards the opposite end of the casing shell (13). A gasket (16) may be placed between the first tube sheet (11) and the shoulder (15) to absorb any shocks that the first tube sheet (11) may experience during transportation or operation. Seated in a groove in the first tube sheet (11) is an O-ring (17) which is adapted for forming a fluid-tight seal between the first tube sheet (11) and the casing shell (13). An end plate (18) which has a fluid outlet (19) is bolted to a flange (20). A second O-ring (22) provides a fluid-tight seal between the end plate (18) and the flange (20).

Figure 1A:
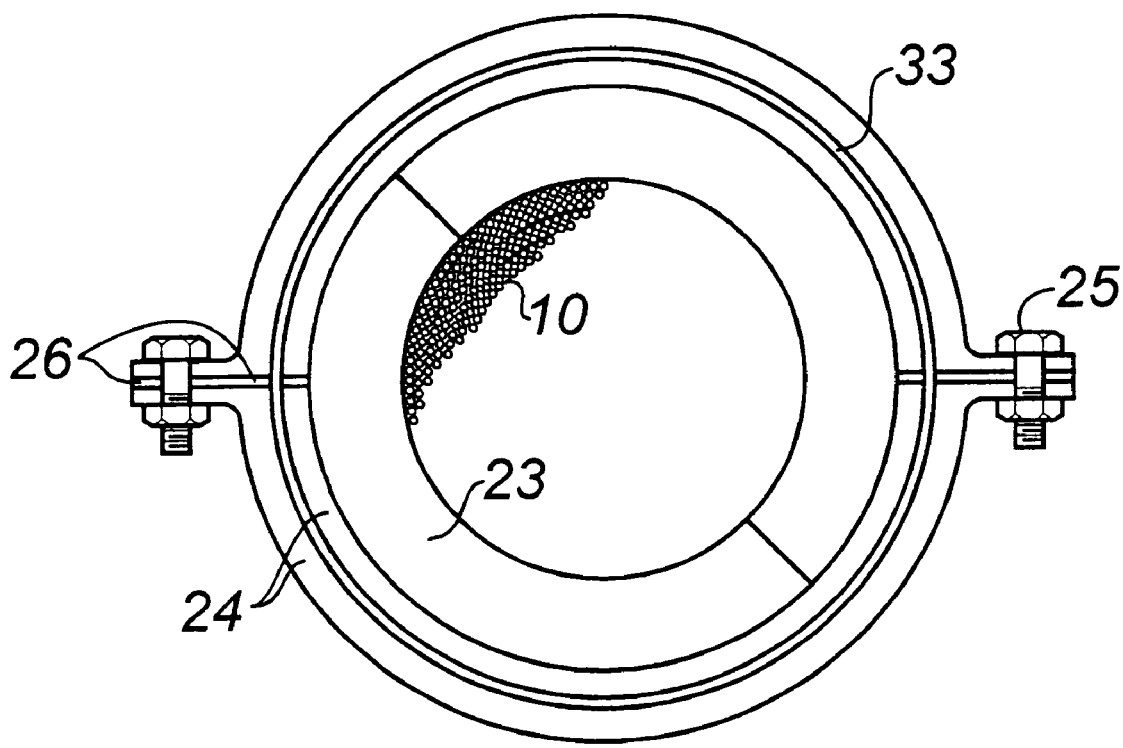
FIG. 1A is a cross-sectional view along the A—A in FIG. 1.

The second tube sheet (12) is placed against a split gasket (23) which is placed onto the split disk (24). The split disk (24) is held together with appropriate means (25) such as a clamp or with bolts. A fluid tight seal (26) is placed between the two halves of the split disk (24) as shown in FIG. 1A. Seated in a groove in the second tube sheet (12) is an O-ring (27) which provides a fluid tight seal between the end cap (28) and the second tube sheet (12). The end cap (28) is provided with a fluid inlet (29) for admitting a fluid or mixture of fluids to the fiber bores. The inside surface of the end cap may need to be machined to a proper size and surface smoothness. A flange (30) is welded to the end cap (28), and a support flange (31) is welded to the casing (13). The end cap (28), the split disk (24), and the casing (13) are secured together by bolts and nuts (32). Additional O-rings (33 and 34) are seated in grooves formed in the flanges (30 and 31). In the embodiment shown, the casing shell (13) may include two sections with threaded ends joined together by means of a joining membrane (36) which acts as a turnbuckle to move the two sections closer together or further apart without twisting the hollow fiber bundle. Once the device is assembled, the joining member (36) may be used to adjust the length of the housing (13) to ensure the gaskets (16 and 23) are seated properly.

The embodiment of the invention illustrated in FIG. 1 is preferably employed for fluid separation by selective permeation of one or more components in the fluid. The fluid to be separated may be introduced to the membrane device via fluid inlet means (29), and the non-permeate is removed from the membrane device via fluid outlet means (19), whereas the permeate stream is discharged from fluid outlet means (35), thereby achieving a counter-current flow configuration with respect to the permeate flow relative to the nonpermeate flow. Alternatively, the entrance (19) and exit (29) of the fluid to be treated may be reversed to achieve a co-current flow of permeate relative to the flow of non-permeate.

Figure 2:
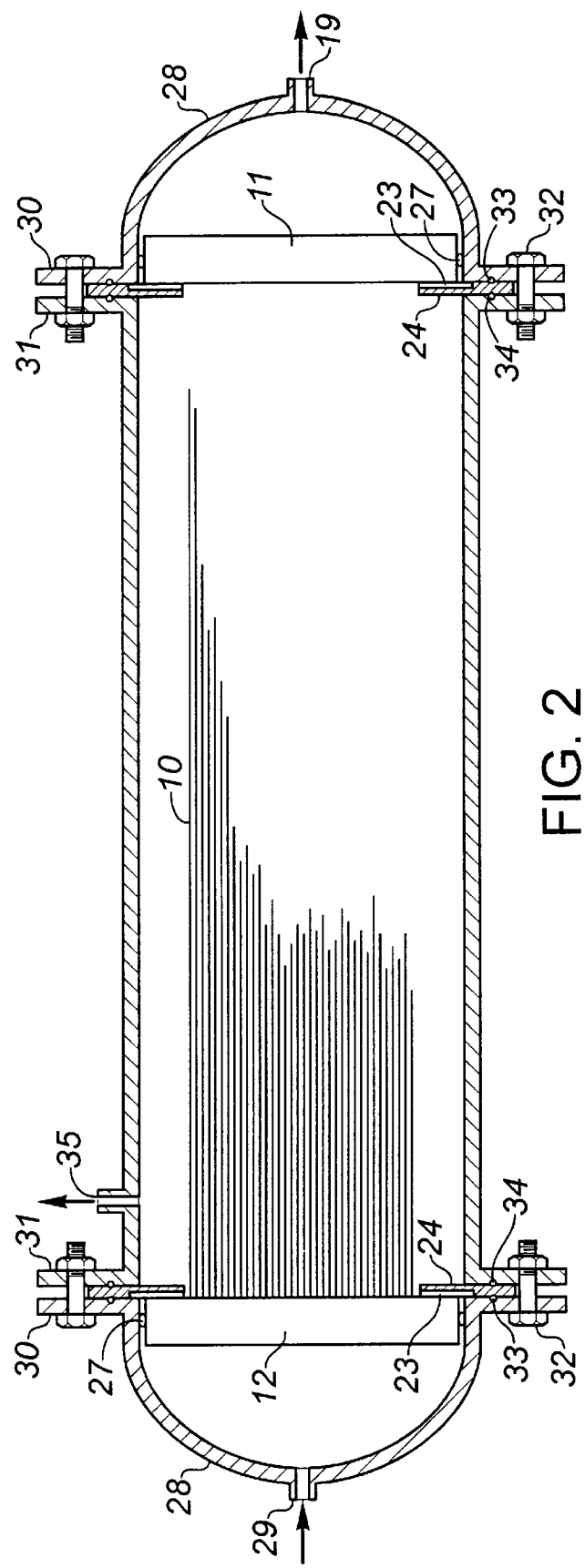
FIG. 2 is a longitudinal sectional view of an alternative embodiment in accordance with this invention.

FIG. 2 illustrates an alternative construction of the hollow fiber membrane device of the invention in which both tube sheets are supported by split disks. For the sake of convenience of fabrication, both tube sheets (11, 12) in this embodiment are of the same size, and both split disks (24) may have the same design and same size.

In operation, the fluid introduced into the device may be a gas mixture and both the permeate and the non-permeate may be gas streams. Non-porous membranes are generally suitable for gas separations. In another preferred embodiment, the fluid to be separated is a liquid mixture, the non-permeate is a liquid stream, and the permeate can be a stream of a liquid, a gas, or a vapor depending on whether the separation is carried out by reverse osmosis, pervaporation, membrane distillation, or membrane stripping. In reverse osmosis, the feed liquid is pressurized and certain components in the liquid preferentially permeate through the membrane, and are removed as a liquid. In pervaporation, vacuum is applied to the permeate side of the membrane, and the preferentially permeable components permeate through the membrane and is removed as a vapor, which can then be condensed as a liquid. In membrane distillation, a temperature gradient between the feed and the permeate sides is maintained, and the separation is due to thermally driven evaporation through the pores on the membrane. The permeate stream is in the vapor state and can be condensed as a liquid. In membrane stripping, a gas dissolved in a liquid is stripped out through the membrane pores, and the permeate is removed in the gas phase. While porous membranes are used for membrane distillation and membrane stripping, it is considered the non-porous membranes are preferred for reverse osmosis and pervaporation applications.

Figure 3:
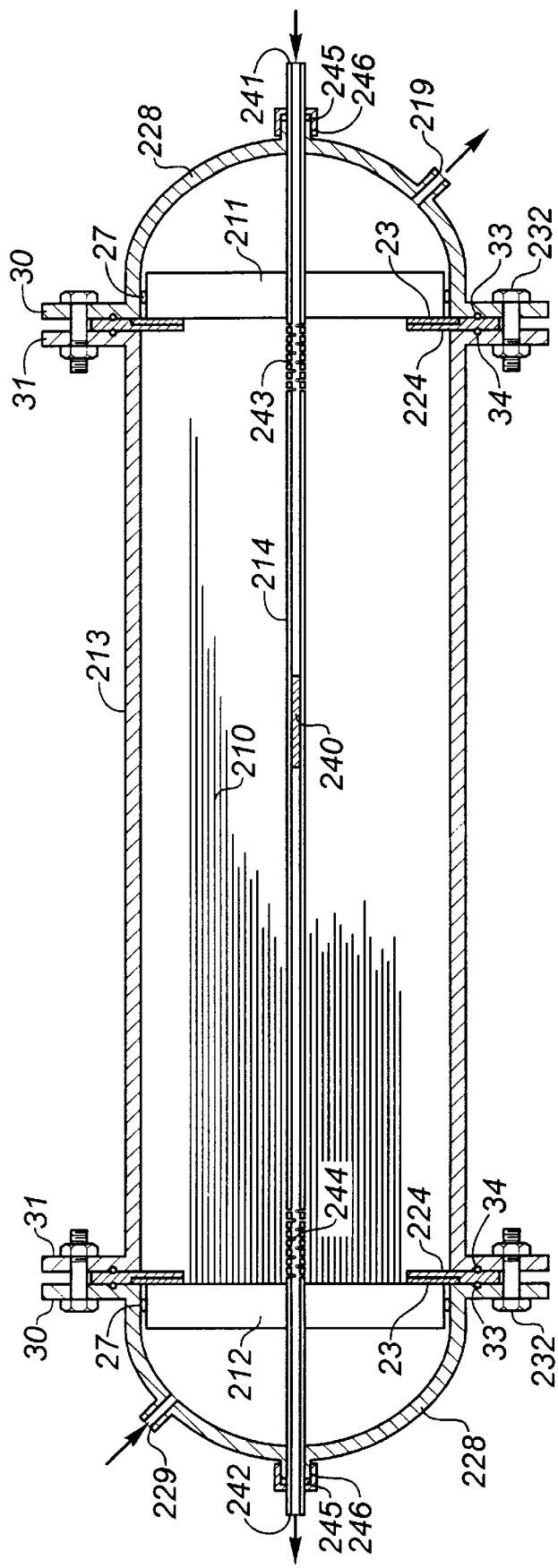
FIG. 3 is a longitudinal sectional view of another alternative embodiment in accordance with this invention.

FIG. 3 illustrates another embodiment of the invention, modified from the embodiment illustrated in FIG. 2 in that it is adapted to use a sweep fluid. The fiber bundle (210) is arranged about a center core tube (214) which extends through and is bonded to the first tube sheet (211) and a second tube sheet (212). The core tube (214) is plugged by a plug (240) located between the two tube sheets (211 and 212) and has an inlet port (241) and an outlet port (242) for the sweep fluid. The sweep fluid, at a pressure lower than the pressure of the primary fluid, is introduced into the shell side of the fiber bundle (210) via perforations (243) near the first tube sheet (211). The sweep fluid flows down in the shell side of the fibers toward the second tube sheet (212) and enters the center core tube (214) via perforations (244) located near the second tube sheet (212) and eventually exits the hollow fiber device through the sweep fluid outlet port (242). The end caps have an inlet (229) or outlet (219) means for introducing or discharging the primary fluid to or from the fiber bores. The end caps (228) are further arranged such that the center core tube (214) extends through the end caps and a seal such as an O-ring (245) and a tight thread seal (246) is used to provide a fluid tight seal between the end caps (228) and the core tube (214). The tube sheets (211 and 212) are received by the end capping means (228) and are supported by split disks (224). Flanges (30 and 31) are attached to the end caps (228) and the shell casing (213) so that the end caps (228), the split disks (224) and the casing (213) are secured together by bolts and nuts (232), as illustrated.

An alternative approach to admission and discharge of the sweeping fluid in the shell side of the hollow fiber membrane device is via a fluid inlet port (not shown) and an outlet port (not shown) formed in the casing shell (213) and located at opposite ends of the casing shell (213), near the first and second tube sheets. However, because of the empty space surrounding the fiber bundle (210), the performance of the membrane device will be affected detrimentally by the flow channelling in the empty space. The device as illustrated in FIG. 3, which uses a center core tube (214) for flowing the sweeping fluid to and from the shell side of the membrane device, can minimize the flow channelling and maintain a better distribution of the sweep fluid at the shell side.

In one preferred embodiment of the invention as illustrated by FIG. 3, the hollow fiber membrane device is used for inert-purging pervaporation, gas separation, membrane stripping, and membrane distillation wherein the permeate side is purged with a stream of sweep fluid which can be a gas or vapor. In another preferred embodiment of the invention, the device is used for absorbing one or more components in a gas stream on the bore side of the hollow fiber membranes by a sweeping liquid on the shell side of the fiber membrane, thereby performing gas absorption in a liquid absorbent. In another preferred embodiment of the invention, the device is used for extracting one or more components in a liquid stream on the bore side of the hollow fiber membranes by sweeping a second liquid on the shell side of the hollow fiber membranes, thereby performing liquid-liquid extraction. Normally, micro porous membranes are preferred to be used for gas absorption and liquid extraction.

Figure 4:
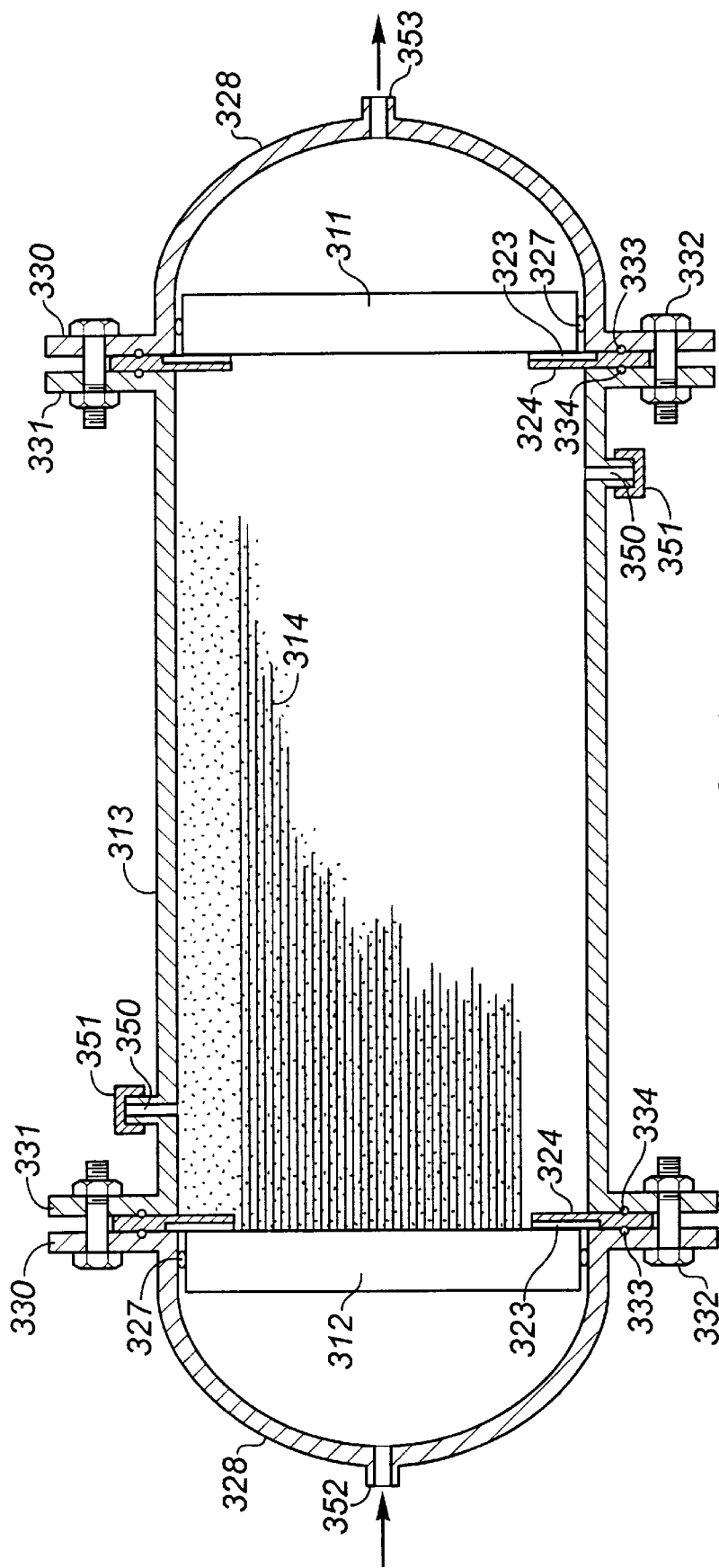
FIG. 4 is a longitudinal sectional view of another alternative embodiment in accordance with this invention.

Another embodiment of the invention is illustrated by FIG. 4. This embodiment illustrates a hollow fiber membrane device which is adapted for contacting one or more components in a fluid with fine solid particles. Exemplary hollow fiber elements filled with fine solid particles are described in U.S. Pat. No. 5,139,668, issued to Pan and McMinis on Aug. 18, 1992. Microporous hollow fiber membranes are preferred for this application. The casing shell (313) of the fiber device contains one or more ports (350) adapted for packing the fine solid particles in the shell side of the hollow fiber bundle (314). Flanges (330 and 331) are attached to the end caps (328) and the shell casing means (313). The tube sheets (311 and 312) are received by the end caps (328), and a fluid tight relationship between the tube sheets and the casing (328) is provided by O-rings (327) seated in the grooves of the tube sheets (311 and 312). The tube sheets (311 and 312) are supported by split disks (324) to bear the load resulting from the pressure difference exerted on the tube sheets (311 and 312) longitudinally. Flanges (330 and 331) are welded respectively to the end caps (328) and the casing shell (313) so as to secure the end caps (328), the split disks (324) and the casing (313) by bolts and nuts (332). The fine solid particles packed in the shell side of the fiber device are immobilized by plugging the port (350) in the casing shell using a plug (351). The fluid to be treated enters the bores of the hollow fibers through a fluid inlet (352) and exits the fiber device via a fluid outlet (353).

In one preferred embodiment of the invention as illustrated by FIG. 4, the fine particles have the capacity of adsorbing one or more components from a fluid. The fluid may be a liquid, a gas or a vapor. Further, the components adsorbed on the adsorbent particles may be desorbed by reducing the pressure, for example, by venting the fiber bores to vacuum, or the atmosphere, or by purging an appropriate sweeping fluid to the bores of the hollow fibers. Desorption may also be enhanced by increasing the desorption temperature. In another preferred embodiment of the invention, the fine particles function as a catalyst of reaction between two or more components in a fluid. In the embodiment wherein the reaction produces a large amount of heat, thermally stable polymeric, metallic or other inorganic materials are preferred for preparing the hollow fiber membranes. Preferably the hollow fiber membranes are highly porous to reduce the resistance to the fluid penetration cross the fiber wall, and yet the pore size is small enough to retain the fine solid particles.

Typical hollow fiber bundles used in any of these embodiments are well-known in the art. One example constructed in accordance with this invention was formed from approximately 400,000 fibers fabricated from a cellulosic-based material and assembled on a perforated core tube, fitted with a tube sheet at each end. Each hollow fiber has a nominal outside diameter of 165 μm and an inside diameter of 65 μm. The tube sheets are severed such that the fiber bores open to both ends. Both tube sheets are cylindrical with a diameter of about 24 cm and a thickness of about 4 cm. The hollow fiber membrane bundle is placed in a permeator shell such as that schematically represented in FIG. 2. The permeator shell has a length of about 96 cm and a nominal diameter of 25 cm. Each tube sheet is received by an end cap and is supported by a split disk made of steel with an inside diameter of about 20 cm. Therefore, the split disk supports the outside 2 cm radial portion of each tube sheet. The split disks bear the force caused by the pressure difference applied across the tube sheets longitudinally. In such an embodiment, the split disks were found to be capable of adequately supporting the tube sheets at inlet pressures well in excess of 2170 kPa.

The amount of support offered by the split disk is a function of its inside diameter and the amount of overlap with the tube sheet it supports. If necessary to have more support to deal with higher pressures, the amount of overlap could be increased by decreasing the inside diameter of the split disk. Of course, that would necessitate a reduction in size of the hollow fiber membrane bundle while maintaining the size of the tube sheet.

The preferred embodiment comprises 2 semi-circular portions making up the split disk, however, it will be appreciated by those skilled in the art that the disk may be split into 3 or more portions while still fitting together to form a circle. It is intended that such insubstantial variants are encompassed by the claims herein.

As will be apparent to those skilled in the art, various modifications, adaptations and variations of the foregoing specific disclosure can be made without departing from the teachings of the present invention.

The embodiments of the invention in which an exclusive property or privilege is claimed are defined as follows:

1. A bore side feed hollow fiber membrane fluid separation device comprising:

(a) a cylindrical housing having an internal diameter and first and second ends wherein said first end includes a support flange;

(b) a plurality of hollow fiber membranes arranged in a longitudinal bundle, said bundle having first and second ends and an external diameter;

(c) a first tube sheet having an external face and an internal face and having a diameter less than the internal diameter of the housing, said first tube sheet encasing the first end of the hollow fiber membrane bundle such that the hollow fiber membranes communicate through and are open on the external face;

(d) a second tube sheet having an external face and an internal face and which encases the second end of the hollow fiber membrane bundle such that the hollow fiber membranes communicate through and are open on the external face, wherein said second tube sheet is supported at the second end of the housing;

(e) a first end cap which engages the housing in a fluid tight manner to enclose the external face of the first tube sheet and a second end cap which engages the housing in a fluid tight manner to enclose the external face of the second tube sheet; and (f) a tube sheet support comprising an annular disk split into two portions which together encircle the hollow fiber membrane bundle adjacent the internal face of the first tube sheet, and which has an outside diameter greater than the internal diameter of the housing such that the annular disk is supported by the support flange.

2. The device of claim 1 wherein the second end of the housing also includes a support flange and wherein the second tube sheet also has a diameter less than the internal diameter of the housing and further comprising a second tube sheet support comprising an annular disk split into two portions which together encircle the hollow fiber membrane bundle adjacent the internal face of the second tube sheet.

3. The device of claim 2 further comprising a central core positioned along the centroidal axis of the hollow fiber membrane bundle wherein the two ends of the core are embedded in the first and second tube sheets.

4. The device of claim 1 wherein the annular disk comprises two semi-circular portions which fit together to form a circle.

5. The device of claim 1 wherein the housing comprises two portions connected by a joining member which may be rotated to adjust the length of the housing.

* * * * *

UNITED STATES PATENT AND TRADEMARK OFFICE
CERTIFICATE OF CORRECTION

PATENT NO.   : 6,224,763 B1
DATED        : May 1, 2001
INVENTOR(S)  : Feng et al.

It is certified that error appears in the above-identified patent and that said Letters Patent is hereby corrected as shown below:

<u>Title page,</u>
Assignee: Alberta Research Council

Signed and Sealed this

Eighth Day of January, 2002

*Attest:*

JAMES E. ROGAN
*Director of the United States Patent and Trademark Office*

*Attesting Officer*